US011452023B2

(12) United States Patent
Huang et al.

(10) Patent No.: US 11,452,023 B2
(45) Date of Patent: *Sep. 20, 2022

(54) AUTOMATIC PATH SELECTION FOR DEVICES IN ROAMING DATA NETWORKS

(71) Applicant: Verizon Patent and Licensing Inc., Basking Ridge, NJ (US)

(72) Inventors: Ye Huang, San Ramon, CA (US); Miguel A. Carames, Long Valley, NJ (US); Jignesh Patel, Haltom City, TX (US); Sudhir Patel, Boonton, NJ (US); Michael R. Waters, Staten Island, NY (US); Gregory D. Roberts, Haslet, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,783

(22) Filed: Nov. 10, 2020

(65) Prior Publication Data

US 2021/0160757 A1    May 27, 2021

Related U.S. Application Data

(63) Continuation of application No. 16/695,407, filed on Nov. 26, 2019, now Pat. No. 10,869,254.

(51) Int. Cl.
*H04W 40/02* (2009.01)
*H04W 36/08* (2009.01)
(Continued)

(52) U.S. Cl.
CPC ............. *H04W 40/02* (2013.01); *H04W 8/08* (2013.01); *H04W 40/30* (2013.01); *H04W 36/08* (2013.01)

(58) Field of Classification Search
CPC . H04W 36/08; H04W 28/0268; H04W 36/14; H04W 40/00; H04W 40/02; H04W 40/12; H04W 40/18; H04W 40/20; H04W 24/02; H04W 36/0009; H04W 36/24; H04W 24/04; H04W 36/0061;
(Continued)

(56) References Cited

U.S. PATENT DOCUMENTS

2013/0276062 A1* 10/2013 Sarawat .................. H04W 4/18
726/3
2017/0332226 A1    11/2017 Bharatia
(Continued)

OTHER PUBLICATIONS

"3rd Generation Partnership Project; Technical Specification Group Services and System Aspects; Architecture enhancements to facilitate communications with packet data networks and applications (Release 16)", 3GPP TS 23.682 V16.3.0 (Jun. 2019).

*Primary Examiner* — Daniel Lai

(57) ABSTRACT

A user device may be provisioned with a list of paths for connecting to a network. A method may include determining that the user device has attached to a visited network and sending the visited network an indication of connectivity capabilities associated with the network. The method may include receiving an indication of one or more paths established from the visited network to the network based on capabilities of the visited network. The one or more paths may be included in the list of paths. The method may include transmitting data to or from the user device via a first path of the one or more paths.

20 Claims, 8 Drawing Sheets

(51) Int. Cl.
*H04W 40/30* (2009.01)
*H04W 8/08* (2009.01)

(58) Field of Classification Search
CPC ..... H04W 36/04; H04W 36/34; H04W 36/38;
H04W 40/28; H04W 76/10; H04W 8/08;
H04W 40/30; H04W 8/12; H04W 76/12
See application file for complete search history.

(56) References Cited

U.S. PATENT DOCUMENTS

| | | |
|---|---|---|
| 2018/0262901 A1 | 9/2018 | Jalkanen et al. |
| 2018/0343601 A1 | 11/2018 | Livanos |
| 2019/0116520 A1* | 4/2019 | Chaponniere ....... H04W 72/042 |
| 2019/0141527 A1 | 5/2019 | Krishan |

* cited by examiner

AUTOMATIC PATH SELECTION FOR DEVICES IN ROAMING DATA NETWORKS

BACKGROUND INFORMATION

This application is a continuation of U.S. patent application Ser. No. 16/695,407, entitled "AUTOMATIC PATH SELECTION FOR DEVICES IN ROAMING DATA NETWORKS," filed on Nov. 26, 2019, the contents of which are hereby incorporated by reference.

BACKGROUND

As the deployment of Internet of Things (IoT) devices continues to increase both domestically and globally, communications networks increasingly need to interact with different networks that employ different technologies. When a user device travels from a home communications network to a roaming communications network, the home communications network may have to navigate roaming devices between the communications networks and ensure that the connectivity and features are properly configured in both communications networks using different technologies. This may result in issues for a service provider.

DETAILED DESCRIPTION OF THE PREFERRED EMBODIMENTS

Figure 1:
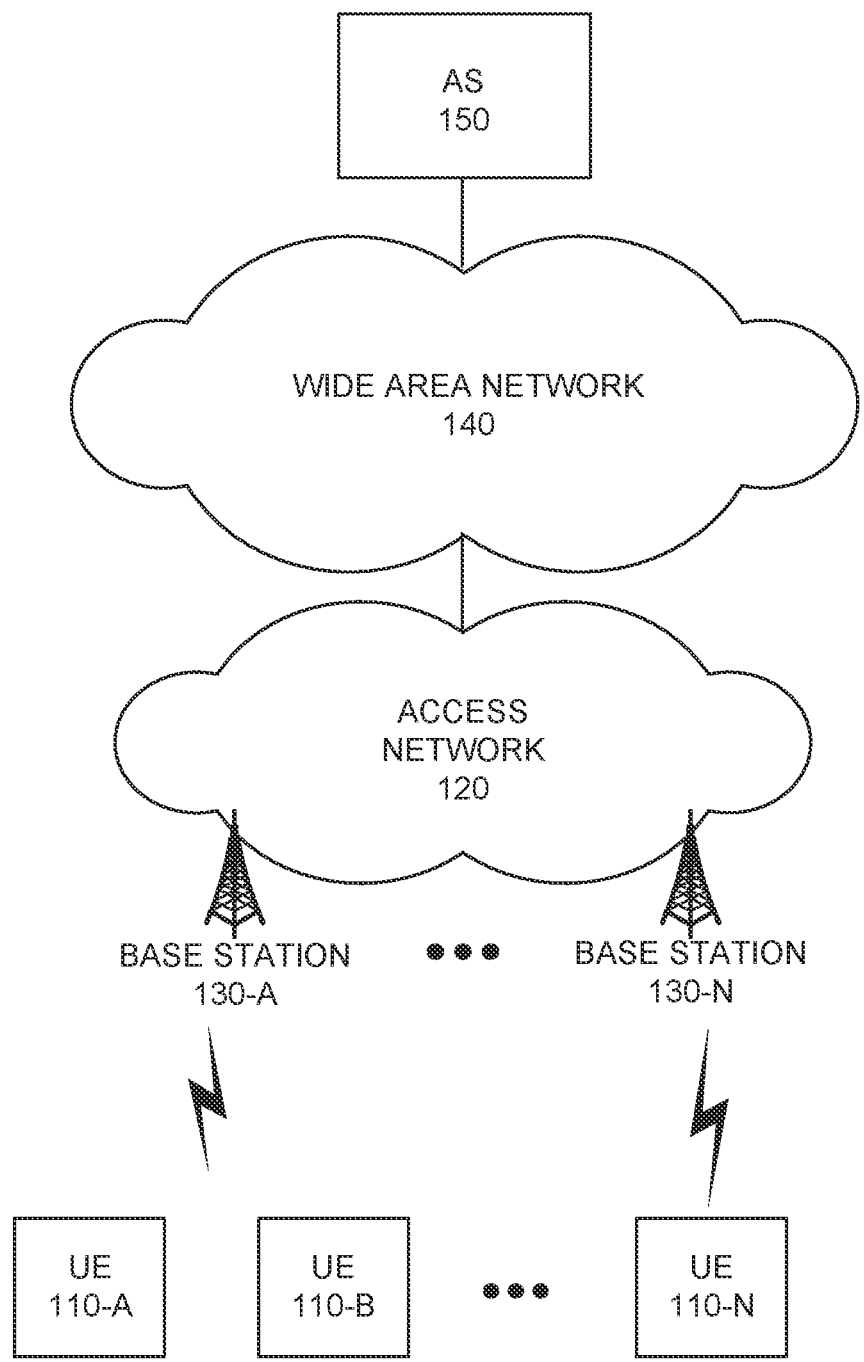
FIG. 1 is a diagram illustrating an exemplary network environment consistent with an embodiment.

The following detailed description refers to the accompanying drawings. The same reference numbers in different drawings may identify the same or similar elements. The following detailed description does not limit the invention.

IoT devices in general and Narrow band IoT (NB-IoT) and long-term evolution (LTE) Category M (Cat-M) devices, specifically, continue to become more popular with increased deployment in both the United States and in global markets. Service capability exposure function (SCEF)-based non-internet protocol (IP) data delivery (NIDD) is a preferred data delivery mechanism for IoT and other user devices operating in home networks or roaming in foreign networks. NIDD services provide efficient communication channels for exchanging data between small/mobile devices and application servers. NIDD protocols may exchange data over a control plane delivery path, and thus can avoid having to set up a full packet data network (PDN) bearer which may be used in conventional IP-based data exchanges. NIDD protocols may also provide header compression and operation optimization to allow effective transmission of transactional data with small frame sizes. Such protocols may be useful in IoT applications (e.g., sensors, machines to machines, etc.) where user equipment devices (UEs) may communicate small quantities of data (e.g., periodically triggered measurements from sensors) with application servers.

Not all communications networks employ the same types of technologies and some communications networks do not have the capabilities to employ particular types of technologies (e.g., NIDD). For example, some networks may implement a simple NB-IoT support via Data over Non-Access Stratum (NAS) protocol. Data over NAS (DoNAS) may, however, be an inefficient solution with a low technical bearer. When a user device roams to a network that employs a different type of technology than the device's home network, the user device may behave differently. It may be challenging to manage, track and interact with the user device due to the differences in technology.

Deployment of SCEF-based communication channels may prove challenging due to the complexity of the end-to-end service call flows involving almost all of the evolved packet system (EPS) core network entities. Due to the potential challenges, outbound roaming devices frequently fail to establish the SCEF roaming service. Instead, current roaming solutions may involve a static and lengthy roaming agreement between networks with different configurations on both networks. Therefore, traffic to a user device in different roaming networks may have to travel via different paths.

In addition, the configurations may be different for each different roaming network. An outbound roaming user device may need to be configured for either DoNAS roaming or SCEF-based roaming statically. The end result may be an increased complexity and a lower quality of service. In addition, the carrier's operational overhead may be increased and the customer satisfaction may be decreased.

Embodiments presented herein address the aforementioned issues by configuring a user device with a preferred path setup profile in order to attach to a preferred communication path in the roaming network based on technologies available in the roaming network. In addition, the home network may perform path detection when a user device is in a roaming network to identify the best path to the user device in the roaming network. Additionally, embodiments herein may help improve downlink data by selecting an alternate path to the user device from the preferred path setup profile if there is poor quality or a delivery failure in a path.

FIG. 1 is a diagram illustrating an exemplary network environment 100 consistent with an embodiment. As shown in FIG. 1, environment 100 may include endpoint user equipment devices (UEs) 110-A to 110-N (referred to herein collectively as "UEs 110" and individually as "UE 110"), an access network 120, a wide area network (WAN) 140, and an application server (AS) 150.

UEs 110 may include any device with long-range (e.g., cellular or mobile wireless network) wireless communication functionality. In some implementations, UEs 110 may communicate using machine-to-machine (M2M) communication, such as machine-type communication (MTC), a type of M2M communication standardized by the $3^{rd}$ Generation Partnership Project (3GPP), and/or another type of M2M communication. UEs 110 may be embodied as Internet of things (IoT) devices, which may include health monitoring devices, asset tracking devices (e.g., a system monitoring the geographic location of a fleet of vehicles, etc.), sensors (e.g., utility sensors, traffic monitors, etc.)

UE 110 may also include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player (e.g., APPLE TV, GOOGLE CHROMECAST, AMAZON FIRE TV, etc.); a smart television; a portable gaming system; a global positioning system (GPS) device; a home appliance device; a home monitoring device; and/or any other type of computer device with wireless communication capabilities and a user interface. UE 110 may also include any type of customer premises equipment (CPE) such as a set top box, a wireless hotspot (e.g. an LTE or 5G wireless hotspot), a femto-cell, etc. UE 110 may include capabilities for voice communication, mobile broadband services (e.g., video streaming, real-time gaming, premium Internet access etc.), best effort data traffic, and/or other types of applications.

Access network 120 may provide access to WAN 140 for UEs 110. Access network 120 may enable UEs 110 to connect to WAN 140 for IP services and/or non-IP data delivery (NIDD) services, mobile telephone service, Short Message Service (SMS), Multimedia Message Service (MMS), multimedia broadcast multicast service (MBMS), Internet access, cloud computing, and/or other types of data services.

Access network 120 may establish or may be incorporated into a packet data network connection between UE 110 and WAN 140 via one or more access point names (APNs). For example, access network 120 may establish a non-IP connection between UE 110 and WAN 140. Furthermore, through an APN, access network 120 may enable UE 110 to communicate with AS 150 via WAN 140.

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a Fifth Generation (5G) access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (Het-Nets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a gNodeB) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an eNodeB).

WAN 140 may include any type of wide area network, a metropolitan area network (MAN), an optical network, a video network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Sub-system (IMS) network (not shown in FIG. 1). An IMS network may include a network for delivering IP multimedia services and may provide media flows between UE 110 and external IP networks or external circuit-switched networks (not shown in FIG. 1).

Application server (AS) 150 may include one or more devices, such as computer devices, databases, and/or server devices, that facilitate non-IP data delivery services. Such services may include supporting IoT applications such as alarms, sensors, medical devices, metering devices, smart home devices, wearable devices, retail devices, etc. Other services may be also be supported such as communications applications (e.g., short message service (SMS), etc.), automotive applications, aviation applications, etc. AS 150 may communicate with UEs 110 over access network 120 using IP and/or non-IP bearer channels. While only one AS 150 is shown in FIG. 1, in various embodiments, multiple application servers may be associated with different entities and used within environment 100. Application servers 150 may be supported by service providers associated with various organizations (e.g., companies, non-profits, collaborative enterprises, etc.).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
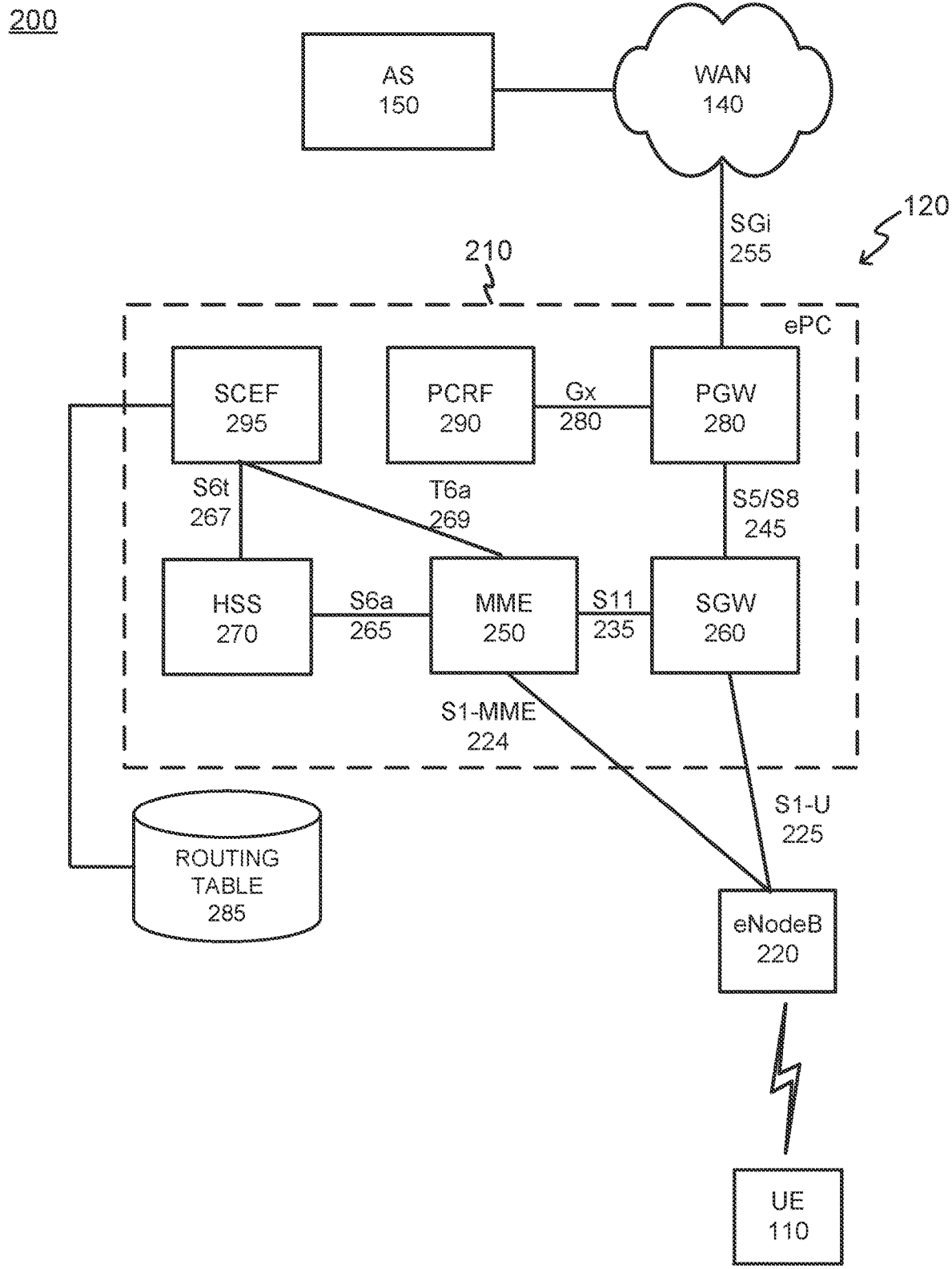
FIG. 2 is a block diagram of an exemplary system having an access network based on an LTE standard.

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). UE 110 and eNodeB 220 may exchange data over a radio access technology (RAT) based on LTE air channel interface protocols. In the embodiment shown in FIG. 2, ePC 210 may operate in conjunction with an evolved Universal Mobile Telecommunications System (UMTS) Terrestrial Network (eUTRAN) that includes at least one eNodeB 220. Networking system 200 may further include an Internet Protocol (IP) network and/or a non-IP network, which may be embodied separately or included in a backhaul network (not shown) and/or in WAN 140. As shown in FIG. 2, AS 150 may be connected to WAN 140 over a wired or wireless connection, using, for example, transmission control protocol/internet protocol (TCP/IP) and/or using a non-IP based protocol.

EPC 210 may include one or more devices that are physical and/or logical entities interconnected via standardized interfaces. EPC 210 provides wireless packet-switched services and wireless packet connectivity to user devices to provide, for example, data, voice, and/or multimedia services. EPC 210 may further include a mobility management entity (MME) 250, a serving gateway (SGW) 260, a home subscriber server (HSS) 270, a packet data network gateway (PGW) 280, a Policy and Charging Rules Function (PCRF) 290, and a SCEF 295. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. ENodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 226 may be implemented, for example, using General Packet Radio Services (GPRS) Tunneling Protocol (GTP). S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may implement tracking and paging procedures for UE 110, may activate and deactivate bearers for UE 110, and may authenticate a user of UE 110 to provide normal coverage service for operating in normal UE device mode. MME 250 may also select a particular SGW 260 for a particular UE 110. MME 250 may interface with other MMES (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to WAN 140 through a SGi interface 255. WAN 140 may provide various services (e.g., over the top voice services) to UE 110. A particular UE 110, while connected to a single SGW 260, may be connected to multiple PGWs 280, one for each packet network with which UE 110 communicates.

Alternatively, UE 110 may exchange data with WAN 140 though a WiFi wireless access point (WAP) (not shown).

The WiFi WAP may be part of a local area network, and access WAN 140 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. MME 250 may communicate with HSS 270 through an S6a interface 265. S6a interface 265 may be implemented, for example, using a Diameter protocol.

Routing table 285 may be a network or computational device that may store information associated with available paths to UE 110 in a roaming network. SCEF 295 may interface with routing table 285 to determine the best path for transmitting data to UE 110. In addition, SCEF 295 may access routing table 285 to determine an additional path for transmitting data to UE 110 in the event that a preferred path is unavailable. In alternative implementations in which access network 120 and/or WAN 140 include a 5G network, a network exposure function (NEF) may perform processing similar to SCEF 295 described herein.

PCRF 290 provides policy control decision and flow based charging control functionalities. PCRF 290 may provide network control regarding service data flow detection, gating, quality of service (QoS) and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 280. Gx interface 280 may be implemented, for example, using a Diameter protocol.

SCEF 295 may include a network or computational device that provides exposure of 3GPP network service capabilities to third party applications. Specifically, SCEF 295 may provide network events through application programming interfaces (APIs) to external applications which may reside on application servers 150 and/or UEs 110. Exposure of the various events may include, for example: UE 110 reachability; UE 110 loss of connectivity; UE 110 location reporting; UE 110 roaming status; communication failure; and change of international mobile equipment identifier—international mobile subscriber identifier (IMEI-IMSI) association. SCEF 295 may facilitate NIDD services through a non-IP packet data network (PDN) established through SCEF 295. In one implementation, SCEF 295 may exchange control plane signaling with MME 250 (via a T6a interface 269 using Diameter protocol) and/or HSS 270 (via an Sh or S6t interface 267). In one implementation, SCEF 295 may be included as part of a control plane bearer path between UE device 110 and AS 150. According to an implementation described herein, SCEF 295 may act as a gateway for connecting UE 110 to AS 150. Generally, SCEF 205 may expose application-programming interfaces (APIs) for multiple application servers (such as AS 150) to access network services to communicate with UEs 110. SCEF 295 may communicate with MME 250 via a modified T6a interface relative to a standardized T6a interface.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
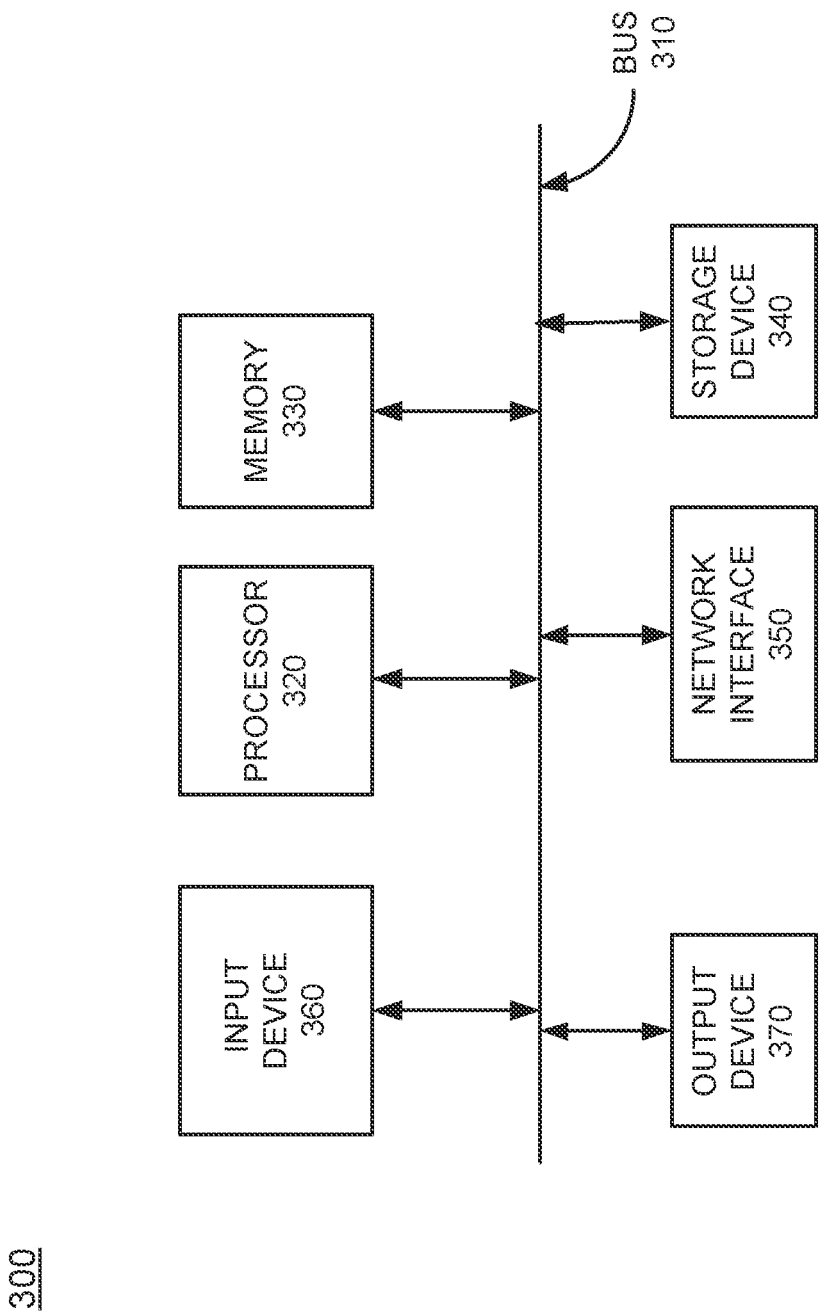
FIG. 3 is a block diagram showing exemplary components of a network device according to an embodiment.

FIG. 3 is a block diagram showing exemplary components of a network device 300 according to an embodiment. Network device 300 may include one or more network elements illustrated in FIG. 2, such as, for example, UE 110, MME 250, and/or HSS 270, SCEF 295, etc. In some embodiments, there may be a plurality of network devices 300 providing functionality of one or more network elements. Alternatively, once network device 300 may perform the functionality of any plurality of network elements. Network device 300 may include a bus 310, a processor 320, a memory 330, storage device 340, a network interface 350, input device 360, and an output device 370.

Bus 310 includes a path that permits communication among the components of network device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX, and/or Linux operating systems. Processor 320 may also use high-level analysis software packages and/or custom software written in any programming and/or scripting languages for interacting with other network entities are communicatively coupled to WAN 140.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read only memory (ROM) device or another type of static storage device, and/or a removable form of memory, such as a flash memory. Storage device 340 may include any type of on-board device suitable for storing large amounts of data, and may include one or more hard drives, solid state drives, and/or various types of redundant array of independent disks (RAID) arrays. In an embodiment, storage device 340 may store profile data associated with UEs 110.

Network interface 350 may include a transceiver that enables network device 300 to communicate with other devices and/or systems in network environment 100. Network interface 350 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 350 may interface with wide area network 140 using a wireless communications channel, such as, for example, radio frequency (RF), infrared, and/or visual optics, etc. Network interface 350 may include a transmitter that converts baseband signals to RF signals and/or a receiver that converts RF signals to baseband signals. Network interface 350 may be coupled to one or more antennas for transmitting and receiving RF signals. Network interface 350 may include a logical component that includes input and/or output ports, input and/or output systems, and/or other input and output components that facilitate the transmission/reception of data to/from other devices. For example, network interface 350 may include a network interface card (e.g., Ethernet card) for wired communications and/or a wireless network interface (e.g., a WiFi) card for wireless communications. Network interface 350 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 300 may perform certain operations relating to automatic path selection. Network device 300 may perform these operations in response to processor 320 executing software instructions contained in a computer-readable medium, such as memory 330 and/or storage device 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the diagram in FIG. 4, the signal flows in FIGS. 5A-5C, and the flow chart shown in FIG. 6.

Although FIG. 3 shows exemplary components of network device 300, in other implementations, network device 300 may include fewer components, different components, additional components, or differently arranged components than depicted in FIG. 3.

Figure 4:
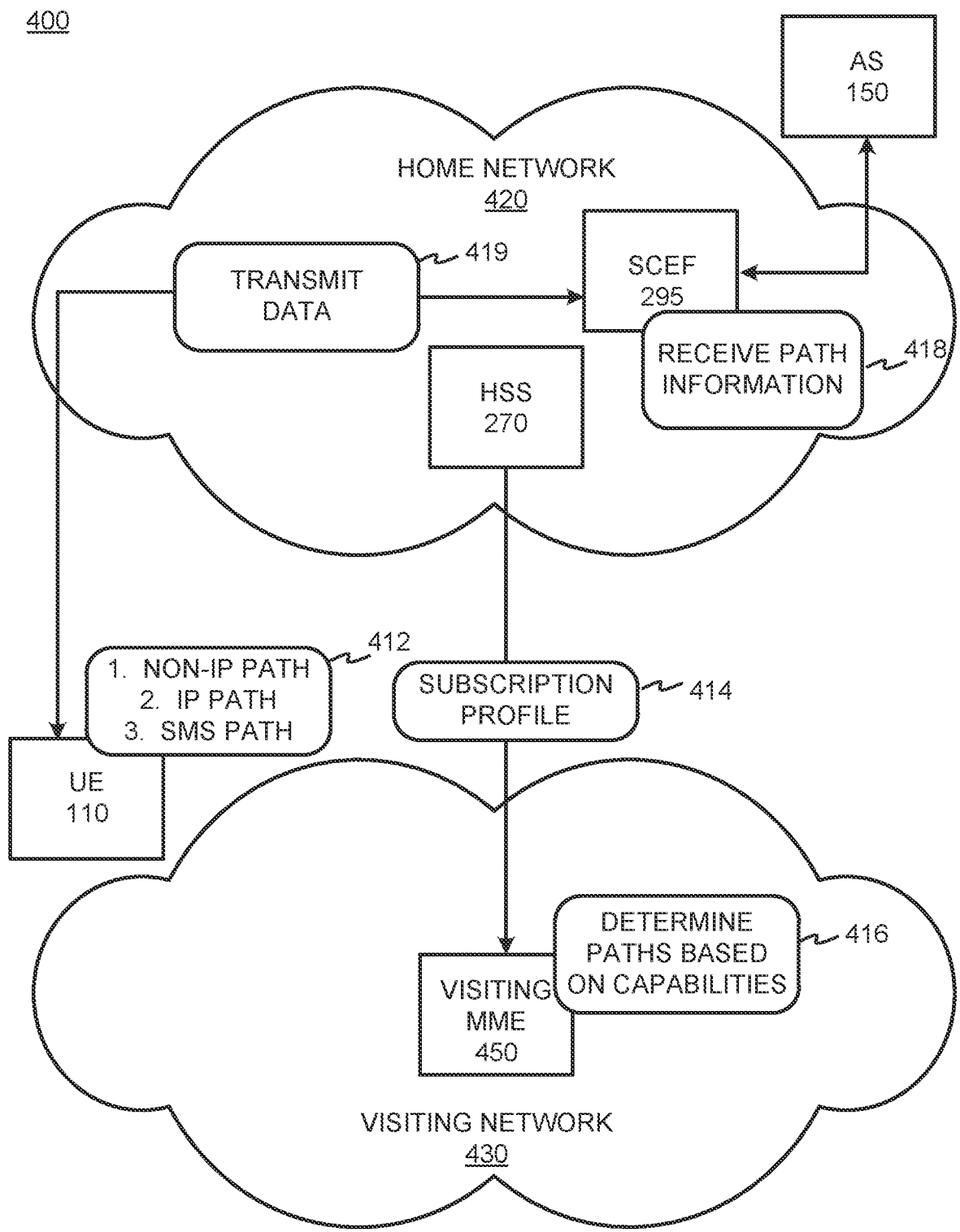
FIG. 4 is a diagram illustrating exemplary components consistent with an embodiment.

FIG. 4 is a diagram illustrating an exemplary network environment 400 consistent with an embodiment. As shown in FIG. 4, environment 400 may include UE 110, AS 150, home network 420, and visiting network 430. Home network 420 may include HSS 270 and SCEF 295. Visiting network 430 may include visiting MME 450. Visiting MME 450 may perform the same functions as the functions described above with respect to MME 250. Although home network 420 and visiting network 430 may include additional components (such as components described above with respect to FIG. 2), some components are not shown in FIG. 4 for the sake of simplicity.

As shown in FIG. 4, UE 110 may travel to visiting network 430. For example, a user of UE 110 may travel internationally and may attach to visiting network 430. When UE 110 attaches to visiting network 430, SCEF 295 may send the visiting network 430 a connectivity profile and the capabilities of home network 420 and HSS 270 may provision the subscriber of UE 110. For example, SCEF 295 may send peering end-system information for connection and authentication and a service level agreement (SLA), which may indicate which services are allowed.

UE 110 may be configured to store a list of connectivity options or capabilities for connecting to AS 150 via SCEF 295 (412). The preferred list may include multiple options for connecting to home network 420 in order of connection preference. As shown in FIG. 4, the first and most preferred option for connecting to home network 420 may include a non-IP or NIDD option. The non-IP option may be the most efficient way to deliver data between AS 150 and UE 110. The second option for connecting to home network 420 may include an IP or DoNAS option. The third option may include an option to attach without a PDN using Short Messaging Service (SMS) only. When attaching using the third option, a PDN and a user plane may not be set up and only the SMS capability may be available. UE 110 may have the preferred list of options pre-loaded so that when UE 110 travels to visiting network 430, UE 110 may be able to send and/or receive data using one or two of the options from the list.

Continuing with FIG. 4, visiting MME 450 may download a subscription profile from HSS 270 on home network 420 (414). For example, visiting MME 450 may download subscriber data including both IP and non-IP PDNs. Visiting MME 450 may further determine which path or paths to set up based on the capabilities of visiting network 430 (416). For example, if visiting network 430 does not have NIDD capabilities, visiting MME 450 may determine to set up paths using the second and third options on the list of connection options (i.e., IP and SMS).

When the paths have been established, SCEF 295 may receive a notification identifying establishment of the path(s) (418). SCEF 295 may record the registration of the path(s) along with session information and an identifier (ID) of visiting network 430. In addition, SCEF 295 may add a path for UE 110 to routing table 285 for mobile terminating (MT) and mobile originating (MO) data. Although SCEF 295 may receiving a notification that multiple paths are able to be established, UE 110 may not set up all of the connections. For example, if visiting MME 450 determines that three paths (i.e., NIDD, IP, and SMS) paths can be established, UE 110 may determine to set up connections based on two of the paths. In this case, SCEF 295 may record information associated with the two paths that have been set up.

When information regarding the established paths has been recorded by SCEF 295, SCEF 295 may deliver or receive MT or MO data based on the best delivery path (419). For example, if an NIDD path and a DoNAS path have been set up, SCEF 295 may deliver data from AS 150 and to UE 110 via the NIDD path.

In addition, because each path traverses SCEF 295, SCEF 295 may be able to monitor the established paths and deliver data via a different path, if necessary. For example, if one of the paths fails, SCEF 295 may deliver data via a different path. For example, if the NIDD path was established and being used to deliver data and the NIDD path fails (e.g., due to a misconfiguration, a change in the roaming agreement, poor performance, or for another reason), SCEF 295 may deliver the data via the IP path or the SMS path (if the IP path is not available).

As another example, if the NIDD path has failed and the SMS path is available, SCEF 295 may send a message to UE 110 via the SMS path requesting that UE 110 set up PDN user plane connectivity. In this example, UE 110 may set up a new path to SCEF 295 via the user plane in order to send and receive data. In this way, alternative path options may be available to UE 110 and UE 110 may be able to send and receive data even in the case of path failure.

As described above, because home network 420 may configure the transport connectivity based on the roaming agreement with visiting network 430 and UE 110 may be configured with all the capabilities for home network 420, there may be multiple options for sending data if a path fails. In addition, since UE 110 may be configured with a list of paths in a preferred order (non-IP or NIDD, IP or DoNAS, then SMS), SCEF 295 may choose the next preferred path in the event of a path failure. In addition, SCEF 295 may send an SMS message to instruct UE 110 to set up a PDN when necessary.

As shown in FIG. 4, UE 110 may be provisioned in HSS 270 and UE 110 may set up a connectivity based on the preferred list of options stored on UE 110. Based on the registration with visiting network 430 and the capabilities of visiting network 430, SCEF 295 may detect what type of connectivity UE 110 can set up with visiting network 430. In addition, since more than one type of connection may be set up, SCEF 295 may be able to send data via alternative routes in the event of a path failure.

Figure 5A:
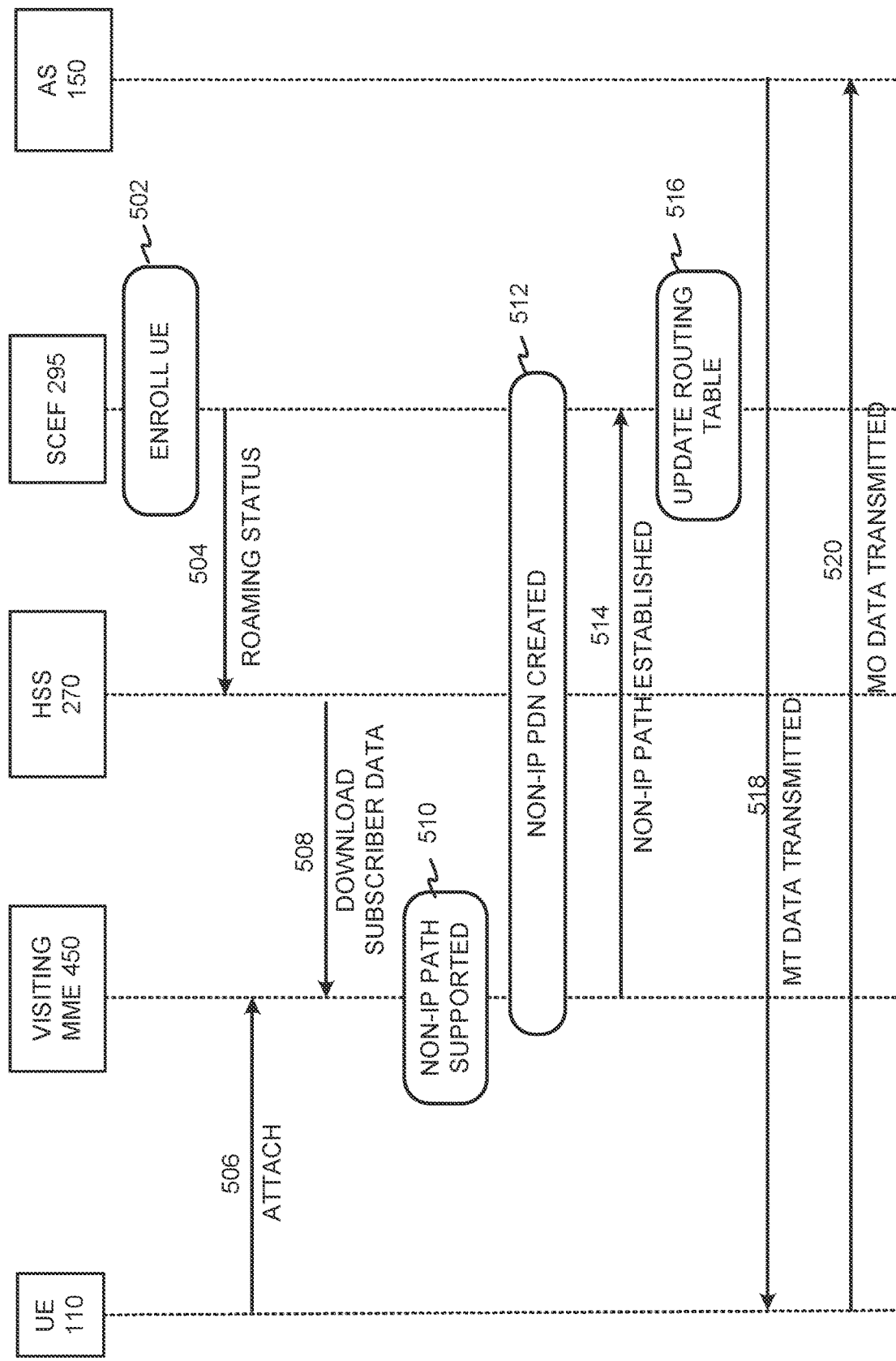
FIGS. 5A-5C are diagrams showing exemplary message flows within a networking system for performing automatic path selection.
Figure 5B:
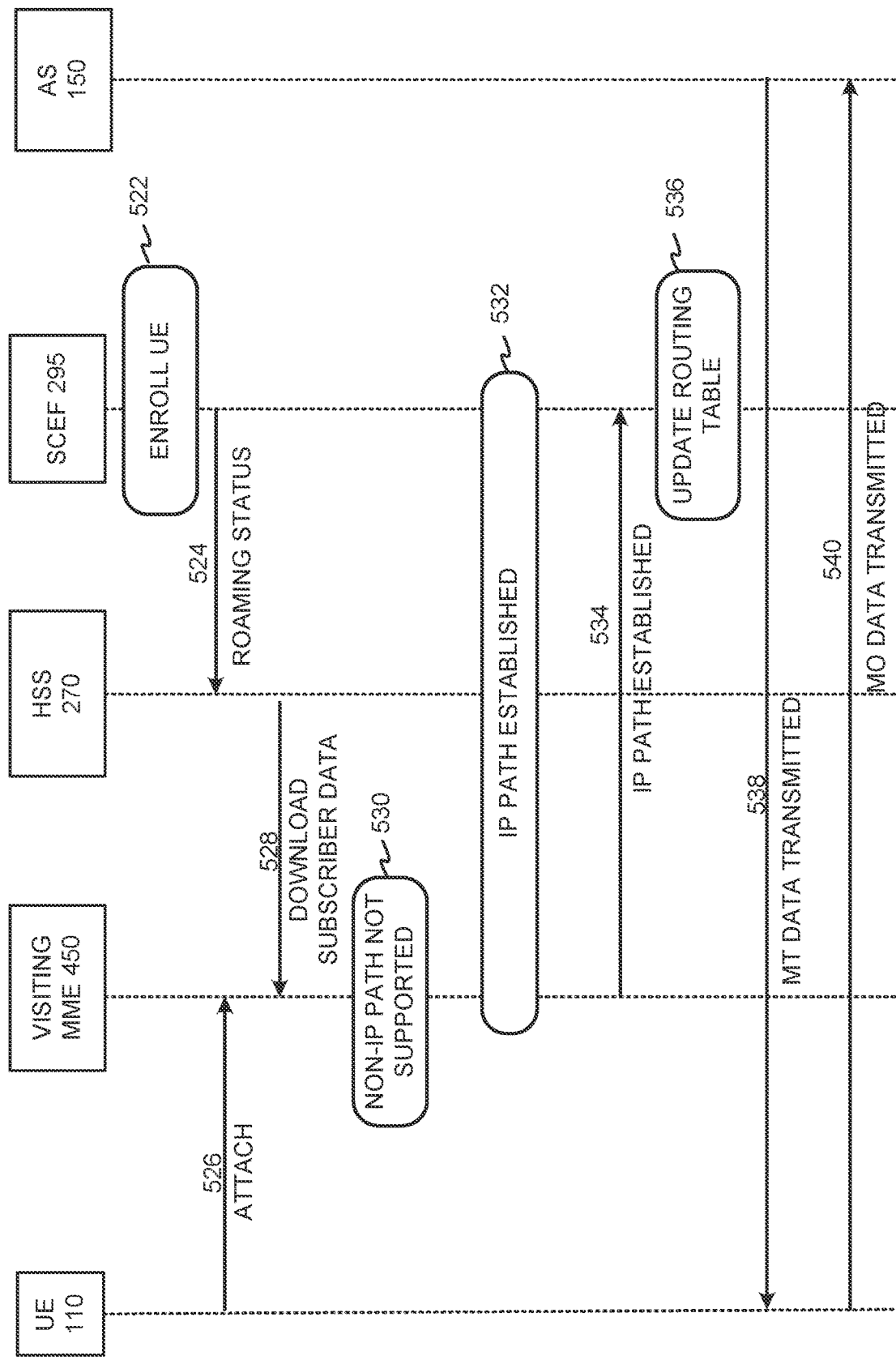
Figure 5C:
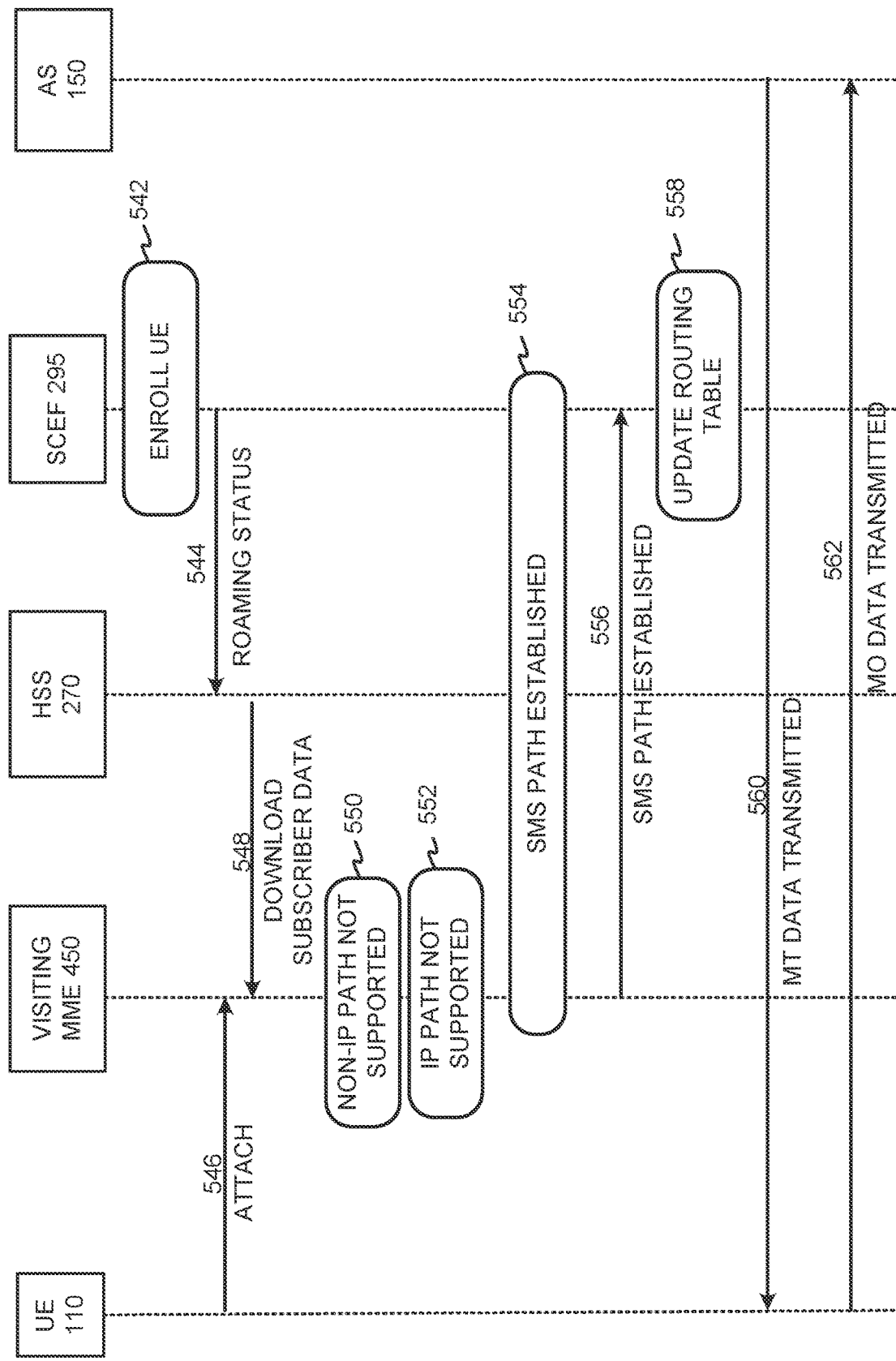

FIGS. 5A-5C are diagrams showing exemplary message flows within a networking system 200 for transmitting data between AS 150 and UE 110 in visiting network 430. FIG. 5A shows exemplary messaging flows for setting up a non-IP connection, FIG. 5B shows exemplary messaging flows for setting up an IP connection, and FIG. 5C shows exemplary messaging flows for setting up an SMS connection.

The most efficient way to deliver data between AS 150 and UE 110 on visiting network 430 may be using a non-IP or NIDD path. Therefore, when establishing a connection with visiting network 430, home network 420 may first attempt to establish the connection via a non-IP path based on the capabilities of visiting network 430. As shown in FIG. 5A, UE 110 may be enrolled with SCEF 295 (502) and SCEF 295 may send HSS 270 a message indicating that the roaming status of UE 110 should be monitored (504). UE 110 may attach to visiting network 430 (506) and visiting MME 450 may download subscriber data from HSS 270 on home network 420 (508). After receiving subscriber data, visiting MME 450 may determine that a non-IP or NIDD path via, for example, a T6/T7 interface is supported (510) and the non-IP PDN may be established (512). SCEF 295 may receive an indication that the non-IP path has been established (514) and SCEF 295 may update routing table 285 with the path information and an ID of visiting network 430 (516). When the non-IP path has been created and SCEF 295 has stored the information associated with the non-IP path, AS 150 may send data, such as MT data, to UE 110 via SCEF 295 (518). In addition, UE 110 may send data, such as MO data, to AS 150 via the established non-IP path via SCEF 295 (520).

When visiting network 430 does not have the capabilities to establish a connection via the non-IP or NIDD path, home network 420 may attempt to establish an IP or DoNAS path, as shown in FIG. 5B. As shown in FIG. 5B, UE 110 may be enrolled with SCEF 295 (522) and SCEF 295 may send HSS 270 a message indicating that the roaming status of UE 110 should be monitored (524). UE 110 may attach to visiting network 430 (526) and visiting MME 450 may download subscriber data from HSS 270 on home network 420 (528).

Visiting MME 450 may indicate that visiting network 430 does not have the capabilities to establish a non-IP path or that a T6/T7 interface is not supported (530) and an S11$u$-based IP path may be established between visiting network 430 and home network 420 (532). SCEF 295 may receive an indication that the IP path has been established (534) and SCEF 295 may update routing table 285 with the path information and an ID of visiting network 430 (536). When the IP path has been created and SCEF 295 has stored the information associated with the IP path, AS 150 may send data, such as MT data, via a DoNAS path to UE 110 via SCEF 295 (538). In addition, UE 110 may send data, such as MO data, via the DoNAS path to AS 150 via SCEF 295 (540).

Turning to FIG. 5C, when visiting network 430 lacks the capabilities to establish a non-IP path and an IP path, an SMS path may be established without a PDN. As shown in FIG. 5C, UE 110 may be enrolled with SCEF 295 (542) and SCEF 295 may send HSS 270 a message indicating that the roaming status of UE 110 should be monitored (544). UE 110 may attach to visiting network 430 (546) and visiting MME 450 may download subscriber data from HSS 270 on home network 420 (548). Visiting MME 450 may determine that visiting network 430 does not have the capabilities to establish a non-IP path or that a T6/T7 interface is not supported (550). Visiting MME 450 may further determine that visiting network 430 does not support an IP or DoNAS path (552). Because the non-IP path and the IP path cannot be established, an SMS path may be established between visiting network 430 and home network 420 (554). UE 110 may send a message to SCEF 295 indicating that UE 110 is reachable only via SMS and that no user plane, T7 interface, or S11u interface has been set up or is available (556). SCEF 295 may update routing table 285 with the path information and an ID of visiting network 430 (558). When the SMS path has been created and SCEF 295 has stored the information associated with the SMS path, AS 150 may send data, such as MT data, via the SMS path to UE 110 via SCEF 295 (560). In addition, UE 110 may send data, such as MO data, via the SMS path to AS 150 via SCEF 295 (562).

Figure 6:
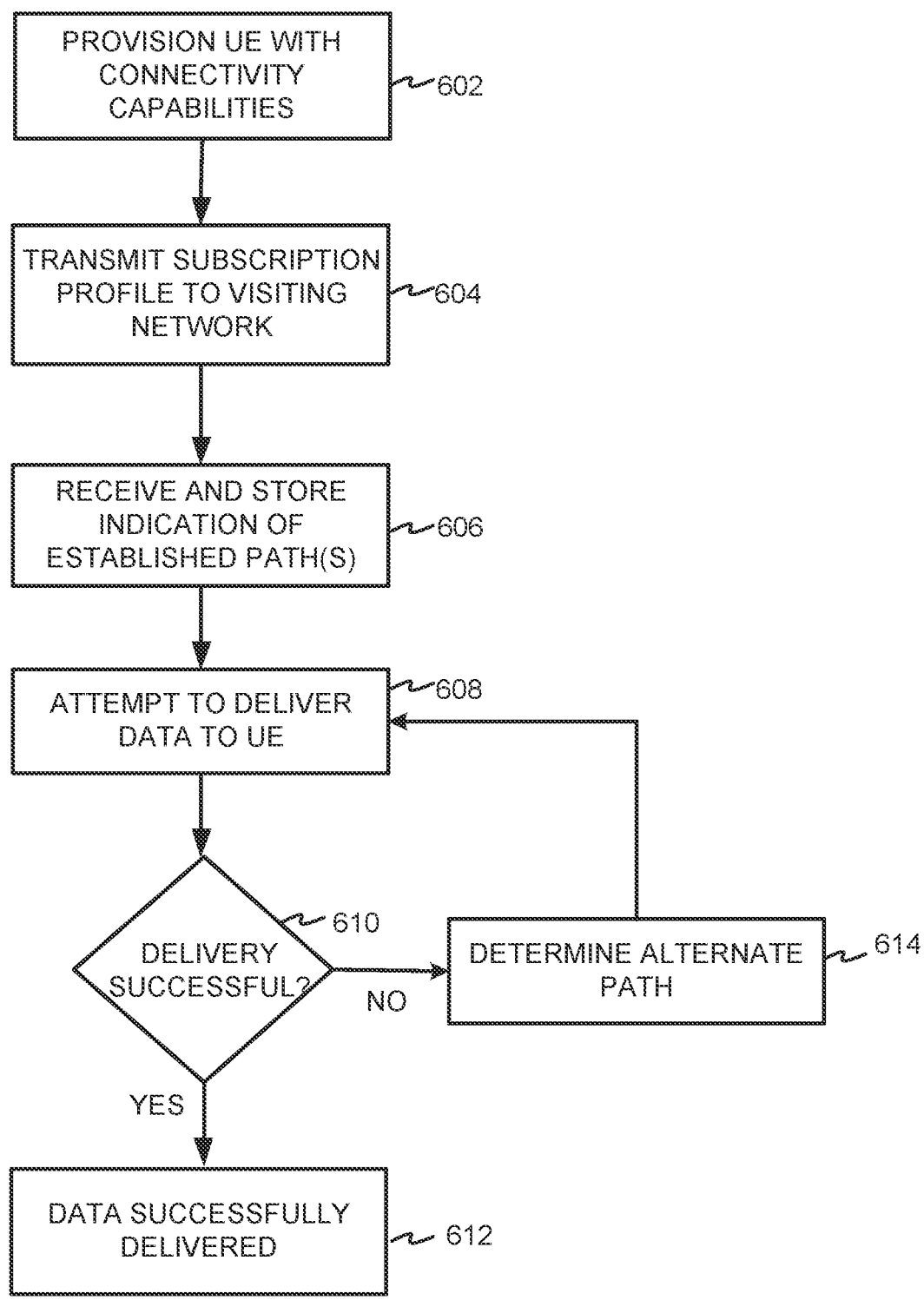
FIG. 6 is a flow chart showing an exemplary process for performing automatic path selection according to an embodiment.

FIG. 6 is a flow chart showing an exemplary process 600 for forming a connection between AS 150 and UE 110 on roaming network 430 via SCEF 295. Process 600 may be performed by SCEF 295, HSS 270, and/or other components of home network 420.

Process 600 may begin by provisioning UE 110 with connectivity capabilities of home network 420 (block 602). For example, UE 110 may be configured to store a list of options for connecting to AS 150 via SCEF 295 in home network 420 when UE 110 is roaming in visiting network 430. In one implementation, the list may indicate a preferred order for connecting to AS 150. For example, the list may indicate that, based on the capabilities of roaming network 430, a preferred order of connection may include connecting via a non-IP path, connecting via an IP path, and connecting via an SMS path.

When UE 110 travels to and forms a connection with visiting network 430, home network 420 may transmit a subscription profile to visiting network 430 (block 604). For example, HSS 270 may transmit the subscription profile to visiting MME 450. In one implementation, the subscription profile may include information associated with IP and non-IP PDNs. The subscription profile may include capabilities associated with home network 420 for forming connections with visiting network 430.

Based on the received subscription profile, visiting network 430 may set up a path based on the capabilities of visiting network 430 and SCEF 295 may receive an indication of the established connection (block 606). For example, SCEF 295 may receive an identifier associated with visiting network 430, an indication of paths that can be set up based on the capabilities of visiting network 430, and an indication of established connections. SCEF 295 may store the information in routing table 285. In one implementation, the available paths and established connections may be stored in routing table 285 in an order of preference.

Process 600 may continue by attempting to deliver data to UE 110 via an established path (block 608). For example, SCEF 295 may receive MT data from AS 150 and may attempt to deliver the data to UE 110 via the best available path identified in routing table 285. SCEF 295 may determine whether the delivery was successful (block 610). If the data delivery was successful (block 610—yes), SCEF 295 may provide an indication to AS 150 that the data was successfully delivered to UE 110 (block 612).

If the data was not successfully delivered to UE 110 (block 610—no), SCEF 295 may determine an alternate route for delivering the data to UE 110 (block 614). In one implementation, SCEF 295 may determine that the data was not successfully delivered to UE 110 because the connection has failed. For example, if SCEF 295 has been sending data to UE 110 via a non-IP or NIDD path, SCEF 295 may determine that the T6/T7 interface has failed and that the data should be sent via a different route. In this case, SCEF 295 may determine from routing table 285 that the next best available path is the IP or DoNAS path. As another example, if the non-IP and the IP paths have failed (or if visiting network 430 does not support the non-IP path and the IP path has failed), SCEF 295 may determine from routing table 285 that the best option is sending data via the SMS path. In this example, SCEF 295 may determine to send the data to UE 110 via the SMS path.

When SCEF 295 has determined an alternate route for sending the data to UE 110, SCEF 295 may attempt to deliver the data via the alternate path (block 608) and determine whether the delivery was successful (block 610). If the delivery was successful (block 610—yes), SCEF 295 may provide an indication to AS 150 that the data was successfully delivered to UE 110 (block 612). If the delivery was not successful (block 610—no), SCEF 295 may determine another path for sending the data to UE 110 (block 614).

Implementations described above with regard to FIG. 6 allow SCEF 295 to detect the path(s) to UE 110 and automatically select a new path to UE 110 if there is a failure in a connection. SCEF 295 may automatically determine a new path based on the path list stored in routing table 285 that indicates the preferred order of paths for delivering data to UE 110. The path list stored in routing table 285 may be based on a preferred path list stored in UE 110. In addition, when non-IP and IP paths are unavailable or when visiting network 430 lacks the capabilities to form non-IP or IP connections, SCEF 295 may communicate with UE 110 using an SMS-only path. SCEF 295 may further offer a unified application programming interface (API) for data delivery for home-based or roaming UEs 110. In addition, since data traveling between AS 150 and UE 110 traverses SCEF 295, SCEF 295 may handle the routing without the need for AS 150 to know which communication path is being used to deliver the data between UE 110 and AS 150.

The process described with regard to FIG. 6 may provide an end-to-end solution for transmitting data between UE 110 and AS 150 via SCEF 295. The signaling procedures include dynamic routing options between AS 150, SCEF 295 in home network 420, and UE 110 in visiting network 430. In addition, the process described above may help improve downlink data by selecting an alternate path if there is poor quality or a failure in a given path by implementing retry logic using an alternate communication path. Further, the process described above may improve the billing and real-time usage control via SCEF 295. For example, SCEF 295 having visibility to all roaming interface options could be beneficial for reporting and billing.

Implementations described herein allow SCEF 295 and/or an NEF in a 5G network to detect the path availability in real-time and automatically maintain up to date routing information for the applications to reach UEs 110. In addition, implementations described herein allow the network to automatically retry multiple delivery attempts over alternative (e.g., less preferred) path(s) if an initial delivery fails via an initial preferred delivery path. In some implementations, SCEF 295 (or an NEF in a 5G network) may generate alarms to provisioning systems and/or personnel associated with the provisioning systems based on errors in realization of roaming peering connectivity SLAs or parameterization in various involved network elements. Implementations described herein also allow SCEF 295 and/or an NEF in a 5G network to initiate an alternative path in concert with UE 110 when UE 110 operates in an optimized mode (e.g., attach without a PDN), which may be used in various situations, such as for low power wide area network devices that desire to remain in a minimal run-time resource mode and set up a path on demand.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 5A-5C and 6, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by one or more devices in a network, that a user device has attached to a visited network, wherein the user device stores an indication of a plurality of paths for connecting to the network when the user device is attached to the visited network;
   receiving, at the one or more devices, an indication of one or more paths, of the plurality of paths, established from the visited network to the network based on capabilities of the network and capabilities of the visited network;
   storing the indication of the one or more paths in a routing table associated with the network; and
   transmitting first data to or from the user device via a first path of the one or more paths.

2. The method of claim 1, further comprising:
   determining a poor transport quality associated with the first path;
   performing a lookup in the routing table to determine an alternate path of the one or more paths; and
   transmitting second data to or from the user device via the alternate path.

3. The method of claim 1, further comprising:
   determining that the first path has failed;
   performing a lookup in the routing table to determine an alternate path of the one or more paths; and
   transmitting second data to or from the user device via the alternate path.

4. The method of claim 1, wherein receiving the indication of the one or more paths further includes receiving an identifier associated with the visited network and an indication of one or more second paths that are able to be established between the visited network and the network.

5. The method of claim 1, wherein the first path includes a preferred path of the one or more paths.

6. The method of claim 1, further comprising:
   transmitting, to the visited network in response to determining that the user device has attached to the visited network, a subscriber profile that includes an indication of the capabilities of the network.

7. The method of claim 1, wherein the indication of the one or more paths indicates an order of connection preference.

8. A system comprising:
   one or more processors configured to:
      determine that a user device has connected to a visited network, wherein the user device stores an indication of a plurality of paths for connecting to a network when the user device is attached to the visited network;
      receive an indication of one or more paths, of the plurality of paths, established from the visited network to the network based on capabilities of the network and capabilities of the visited network;
      store the indication of the one or more paths in a routing table associated with the network; and transmit first data to or from the user device via a first path of the one or more paths.

9. The system of claim 8, wherein the system further comprises the routing table, and wherein the one or more processors are further configured to:
determine a poor transport quality associated with the first path;
perform a lookup in the routing table to determine an alternate path of the one or more paths; and
transmit second data to or from the user device via the alternate path.

10. The system of claim 8, wherein the one or more processors are further configured to:
determine that the first path has failed;
perform a lookup in the routing table to determine an alternate path of the one or more paths; and
transmit second data to or from the user device via the alternate path.

11. The system of claim 8, wherein, when receiving the indication of the one or more paths established from the visited network to the network, the one or more processors are further configured to receive an identifier associated with the visited network and an indication of one or more second paths that are able to be established between the visited network and the network.

12. The system of claim 8, wherein the first path includes a preferred path of the one or more paths.

13. The system of claim 8, wherein the one or more processors are further configured to:
transmit, to the visited network in response to determining that the user device has attached to the visited network, a subscriber profile that includes an indication of the capabilities of the network.

14. The system of claim 8, wherein the indication of the one or more paths indicates an order of connection preference.

15. A non-transitory computer-readable medium comprising instructions, which, when executed by a processor in a network, cause the processor to:
determine that a user device has attached to a visited network, wherein the user device stores an indication of a plurality of paths for connecting to the network when the user device is attached to the visited network;
receive an indication of one or more paths, of the plurality of paths, established from the visited network to the network based on capabilities of the network and capabilities of the visited network;
store the indication of the one or more paths in a routing table associated with the network; and
transmit first data to or from the user device via a first path of the one or more paths.

16. The non-transitory computer-readable medium of claim 15, wherein the instructions further cause the processor to:
determine a poor transport quality associated with the first path;
perform a lookup in the routing table to determine an alternate path of the one or more paths; and
transmit second data to or from the user device via the alternate path.

17. The non-transitory computer-readable medium of claim 15, wherein the instructions further cause the processor to:
determine that the first path has failed;
perform a lookup in the routing table to determine an alternate path of the one or more paths; and
transmit second data to or from the user device via the alternate path.

18. The non-transitory computer-readable medium of claim 15, wherein the instructions that cause the processor to receive the indication of one or more paths established from the visited network to the network further include instructions that cause the processor to receive an identifier associated with the visited network and an indication of one or second paths that are able to be established from the visited network to the network.

19. The non-transitory computer-readable medium of claim 15, wherein the instructions further cause the processor to transmit, to the visited network in response to determining that the user device has attached to the visited network, a subscriber profile that includes an indication of the capabilities of the network.

20. The non-transitory computer-readable medium of claim 15, wherein the indication of the one or more paths indicates an order of connection preference.

\* \* \* \* \*